Patented Sept. 7, 1943

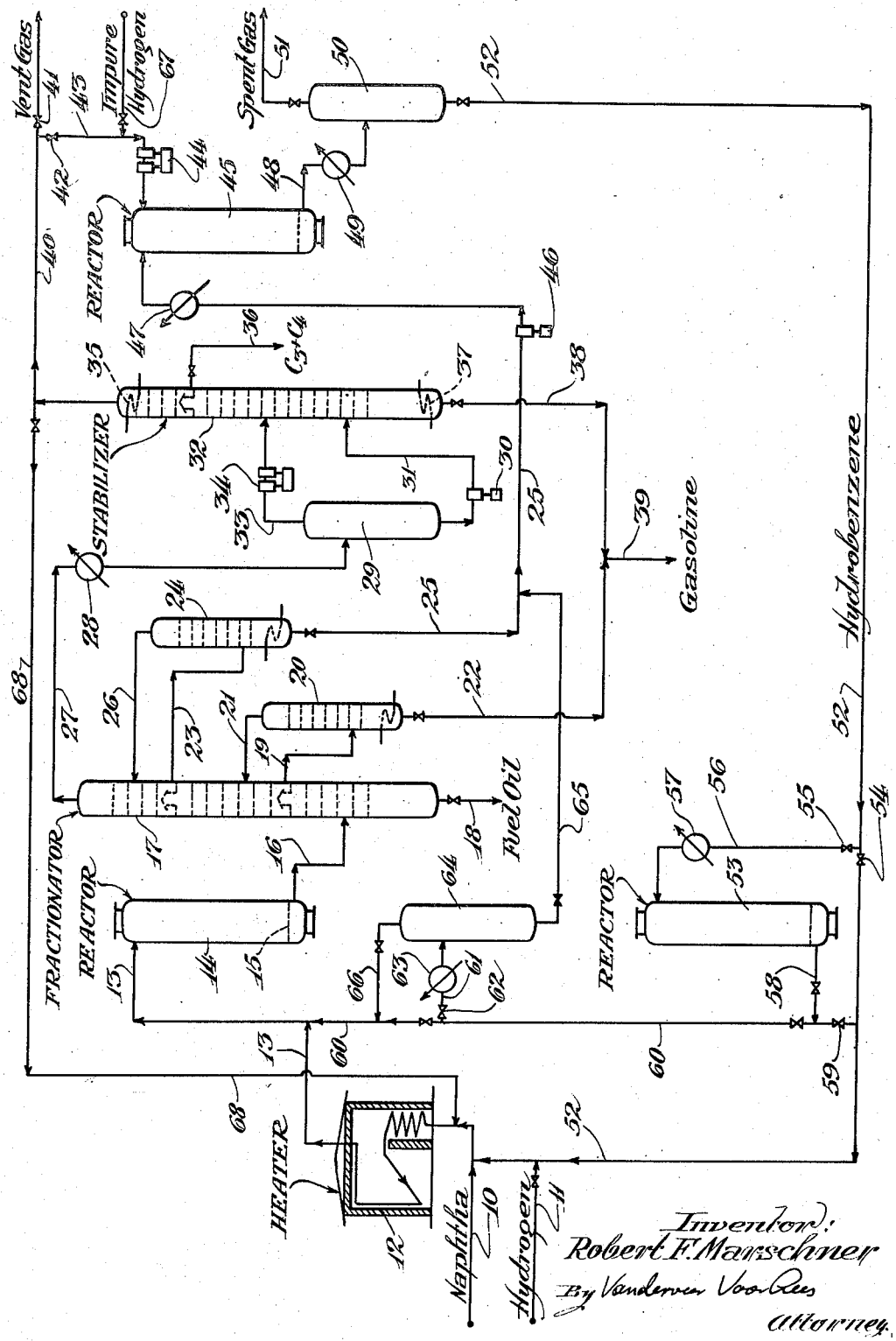

2,328,828

UNITED STATES PATENT OFFICE 2,328,828

HYDROGEN PURIFICATION PROCESS

Robert F. Marschner, Chicago, Ill., assignor to Standard Oil Company, Chicago, Ill., a corporation of Indiana Application January 31, 1941, Serial No. 376,831

10 Claims. (Cl. 196—50)

This invention relates to the conversion of hydrocarbon oils and also to the purification of hydrogen.

In the reforming of gasoline and naphthas of low knock rating to produce high knock rating gasoline it has been found that treatment of the vapors with certain dehydrogenating catalysts at elevated temperature effects an important increase in the knock rating of the naphtha, especially where the reaction is carried out at relatively low pressures in the presence of hydrogen. The role of the hydrogen in the reaction is not thoroughly understood but it appears that the hydrogen in some way sustains the dehydrogenating activity of the catalyst.

In general, there is a net production of hydrogen in the process so that the process may be operated without consumption of hydrogen providing that the hydrogen separated from the reaction products may be returned to the system. This has not always been possible because of the accumulation of impurities, particularly hydrocarbon gases, which contaminate the hydrogen and which interfere with its utilization in the process.

One object of this invention is to purify the hydrogen while recycling in the process. Another object of the invention is to substitute a hydrogen carrier for the hydrogen thereby reducing or eliminating the use of hydrogen as such and provide nascent hydrogen for the reaction. Still another object of the invention is to provide a process for purification of the hydrogen in hydrogen-containing gases from contaminants such as methane and nitrogen from which the hydrogen is not easily separated. Other and more detailed objects, advantages and uses of my invention will become apparent as the description thereof proceeds.

The process is illustrated by a drawing which shows diagrammatically an apparatus for the purification of hydrogen in the reforming of low knock rating naphthas to produce high knock rating gasoline. Referring to the drawing, naphtha added by line 10 and hydrogen added by line 11 are introduced into heater 12 where the naphtha is vaporized and the vapors and hydrogen are heated to a desired reforming temperature, e. g., 850 to 1050° F. or a temperature sufficiently higher to provide this temperature within the subsequent reactor. The naphtha employed may be a straight run heavy naphtha, for example, from Mid-Continent or Pennsylvania crude oil, and the knock rating of the naphtha may be about 25 to 45 A. S. T. M. Naphtha having a boiling range of about 250 to 425° F. is quite satisfactory. Heavier naphtha may be employed if desired, even including kerosene or light gas oil.

The amount of hydrogen employed will usually be about 1 to 2 mols per mol of naphtha treated, although more or less hydrogen may be employed if desired. For example, 0.5 to 4 mols of hydrogen per mol of naphtha may be used. These values take no account of the hydrogen produced from the naphtha, but include that produced in situ from added hydrogen-producing substances.

The heated naphtha vapors and hydrogen are conducted by transfer line 13 to the upper part of the reactor 14 where the vapors flow downwardly through a porous catalyst which may be in the form of granular material placed in a bed resting on perforated and screened support 15. The catalysts used for this purpose are generally dehydrogenating catalysts consisting of metal oxides and mixtures of metal oxides; generally oxides of the transition elements in groups II to VI of the Periodic System are useful. Chromium and molybdenum oxides, vanadium oxide, nickel, cobalt and copper oxides may be used. These may be employed alone but preferably they should be employed on a supporting material. Thus, about 5 to 25% of chromia or molybdena may be deposited on active alumina, alumina gel, bauxite, etc. The oil vapors introduced into reactor 14 are preferably heated to a sufficiently high temperature to effect the desired conversion and temperatures of around 900 to 1025° F. in the subsequent reactor are usually satisfactory.

The rate of treating the naphtha may be kept within the range of about 0.1 to 10 space velocity, i. e., volumes of liquid naphtha charged per volume of catalyst space per hour. More specifically, space velocities within the range of 0.5 to 1 or 2 are very satisfactory.

From reactor 14 the vapors are conducted by line 16 to fractionator 17 wherein they are fractionated to eliminate a bottom fraction, higher boiling than the desired gasoline. This is withdrawn by line 18. A heavy naphtha fraction is withdrawn by trapout 19 and further fractionated in side stripper 20, the vapors being returned to the column by line 21 and the heavy naphtha being discharged by line 22. A benzene fraction is withdrawn by trapout line 23 leading to side stripper 24 where it is further fractionated to separate a close boiling fraction containing largely benzene and boiling in the range of about 160 to 185° F. Vapors are returned to the column by line 26. Uncondensed vapors are withdrawn from the top of the column 17 by line 27 leading to condenser 28 and receiver 29. Condensed light naphtha in receiver 29 is forced by pump 30 through line 31 to stabilizer 32 while uncondensed gases in 29 are withdrawn by line 33 and forced by compressor 34 into the same stabilizer column. The pressure in stabilizer column 32 may be conveniently about 150 to 500 pounds per square inch, usually about 200 to 250 pounds per square inch. The pressure in reactor 14 will be the same or lower, e. g., 50 to 450 pounds per square inch, with about 100 to 300 pounds per square inch the preferred range. Reflux coil 35 provides condensation at the top and a propane-butane fraction containing considerable of the $C_2$ hydrocarbons is withdrawn by trapout 36. Reboiling in the stabilizer is provided by heating coil 37 and stabilized light naphtha is withdrawn by line 38, and may be mixed with the heavy naphtha in line 22 to produce the desired gasoline which is discharged from the system at 39.

Uncondensed gases, containing a large amount of hydrogen, for example, 25 to 75% by volume, from the top of stabilizer 32 are removed by line 40 and in part may be discharged from the system through valve 41. However, it is preferred to conduct these gases through valve 42 and line 43 leading to compressor 44 where the gases are compressed, if necessary, to a pressure suitable for the hydrogenation reaction in reactor 45. Reactor 45 contains a hydrogenating catalyst which may be the same as the catalyst in reactor 14, for example, chromia or molybdena on active alumina. In general, however, these do not represent the most satisfactory catalysts for the purpose, since materials which are more active at lower temperatures are to be preferred. Nickel and cobalt as well as copper catalysts prepared by decomposition of the nitrates, formates, acetates, etc., on an inert support such as glass, porcelain, pumice, etc., followed by reduction or by treatment of alloys with alkali-soluble metals are suitable catalysts. Platinum and other VIIIth group metals supported upon stable, inert materials such as porcelain, asbestos, silica, and even coke are also satisfactory. Certain specially prepared chromium catalysts may be used.

The benzene fraction withdrawn from stripper 24 by line 25 is conducted through pump 46 and heater 47 where it is vaporized and heated to the desired reaction temperature, for example, 600 to 800° F. The vapors are mixed with the hydrogenous gas in compressor 44 and the vapor mixture is passed through the catalyst in reactor 45 to effect hydrogenation of the benzene. The pressure employed in reactor 45 will depend primarily upon the nature and activity of the catalyst used, but also upon the temperature, since the less active the catalyst, the higher the temperature required and the more pressure necessary to obtain reasonably complete hydrogenation. If the catalyst is molybdena, vanadia or chromia, for example, the pressure will usually be high, e. g., about 500 to 2000 pounds per square inch, or even higher, for example, 4000 or 5000 pounds per square inch. With other catalysts, however, such as active nickel, lower pressures may be employed, for example, 50 to 500 pounds per square inch, or the pressure may be conveniently about the same as the pressure in stabilizer 32. A lower temperature may also be employed, e. g., 300 to 600° F. When using active nickel and other sensitive catalysts, however, it is necessary to purify the gases to remove catalyst poisons, such as sulfur compounds, before contacting with the catalyst. A variety of methods may be used for the purpose, including precontacting the fraction with spent catalyst. With specially-prepared, extremely active catalysts, hydrogenation may proceed at room temperature and atmospheric to 100 pounds pressure.

In reactor 45 the aromatic hydrocarbons, particularly benzene in this case, are converted into hydro-aromatic hydrocarbons and sufficient aromatic hydrocarbons are employed to utilize substantially all of the hydrogen contained in the gases introduced into the reactor. The aromatic hydrocarbons may be partially or completely hydrogenated. By "partially hydrogenated" it is meant that not all of the benzene, for example, is hydrogenated to cyclohexane, some benzene remaining unconverted. It is not meant that all of the benzene is partially hydrogenated to dihydro and tetrahydro benzene.

Although benzene has been used as one example, other aromatics may be effectively used. Toluene and xylene may be employed but are not readily removed from the customarily reformed naphthas. Benzene is particularly adaptable for heavy naphthas having initial boiling points above 200° F. On the other hand, for naphthas having final boiling temperatures below 450° F. diphenyl may be employed, and for boiling temperatures below 375° F. or even 400° F. naphthalene may be used. These polycyclic aromatics have a distinct advantage. Since diphenyl weighs about twice as much per mol as benzene, but can carry exactly twice as much hydrogen, a little less liquid diphenyl has to be recycled than benzene to secure a desired hydrogen concentration, but since a mol of diphenyl has the same vapor volume as a mol of benzene, the reactor size need not be as large for a desired throughput and hydrogen concentration when a polycyclic aromatic is employed as when a monocyclic is used.

The vapors withdrawn from the base of reactor 45 pass by line 48 to condenser 49 where the hydro-aromatics are condensed and discharged into receiver 50. Gases separated in 50 are discharged by line 51 while the liquid hydro-aromatic products are conducted by line 52 back to the heater 12 where they may be substituted for the hydrogen introduced from line 11. Thus, after the process has been placed in operation the supply of hydrogen from 11 may be shut off. When the hydro-aromatic hydrocarbons come in contact with the catalyst in reactor 14, hydrogen is liberated again as a result of the dehydrogenating action of the catalyst contained in 14 under the low pressure conditions existing therein.

If desired, part or all of the hydro-aromatics may be dehydrogenated in reaction chamber 53 by regulating valves 54 and 55 and diverting the hydro-aromatics through line 56 and heater 57.

Reactor 53 contains a dehydrogenating catalyst which may be the same as or different from the catalyst in reactor 14. The conditions of temperature and pressure in reactor 53 may also be substantially the same as those in reactor 14, but somewhat milder conditions are preferred, for example, 800 to 1000° F., or 925° F. specifically. The hydrogen and aromatic hydrocarbons from 53 are conducted by line 58 through valve 59 leading to line 52 and heater 12 or they may be conducted through valve 60 leading directly to reactor 14. In this latter case, the heat capacity of the hydrogen-aromatic mixture from reactor 53 serves to reduce the heat requirements of reactor 14.

In some cases it may be desirable to reduce the amount of hydrocarbons charged to reactor 14 by recycling thereto only the hydrogen separated from the hydro-aromatics in hydrogenator 53 and return the aromatics to hydrogenator 45 to be rehydrogenated therein. To accomplish this, part or all of the stream of aromatics and hydrogen flowing through line 60 in the direction of reactor 14 may be diverted through line 61 and valve 62, thence through cooler 63 and into separator 64. The amount of products so by-passed may be regulated by valve 65.

From separator 64 aromatic liquid is withdrawn by line 65 and conducted to inlet of pump 46 discharging into reactor 45. Hydrogen separated in separator 64 is conducted by line 66 back to line 60, whence it flows by line 13 to reactor 14. If desired, this hydrogen may be conducted to the inlet of heater 12 by a line not shown.

In case the reforming process is not in balance with respect to hydrogen requirements and additional hydrogen is needed, it may be introduced as impure hydrogen drawn from an external source and introduced by valved line 67. For this purpose it is preferable to employ hydrogenous gases containing 50% or more hydrogen by volume. Gases from high temperature, vapor phase cracking still operations and hydrogenous gases from the pyrolysis of propane or other hydrocarbons at high temperature are suitable. Gases containing 70 to 90% of hydrogen by volume are particularly suitable, and such gases result from the high temperature pyrolysis of propane and lighter hydrocarbons, especially if a separation between fixed gases and liquid, condensible or polymerizable products, is made. Hydrogen, mixed with nitrogen, produced by cracking ammonia, viz:

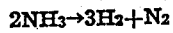

$$2NH_3 \rightarrow 3H_2 + N_2$$

may be freed from nitrogen in this manner.

My process may be operated as a general method for the purification of hydrogen-containing gases. For example, valve 42 may be closed and gases may be introduced to the system by line 67, employed to hydrogenate benzene in reactor 45 and the hydrobenzene resulting may be dehydrogenated in reactors 53 and/or 14 followed by the recovery of the benzene and hydrogen. The benzene may be recycled through line 25 back to reactor 45, the purified hydrogen substantially free of hydrocarbon gases being discharged from the system at 41. Any benzene in the fraction which is not separated in the fractionator 17 may be separated in fractionator 32 and returned to the reactor 45 by a line not shown.

In general, the charging stock supplied to my process will produce sufficient aromatic hydrocarbons to make available the desired amount of benzene, toluene, xylene, or ethyl benzene necessary for the operation of the process. However, the process may be placed in operation more rapidly if some benzene is added to the charging stock when beginning operation. Alternatively, extra hydro-aromatics such as hydrobenzene may be added to the process at the start of operations, introducing it through line 11 in place of hydrogen. I may also recycle part of the hydrogenous gas to furnace 12 or reactor 14 along with the hydrobenzene, or hydrogen derived from hydrobenzene, thereby obtaining the combined effect of both and ensuring a supply of hydrogen in the early part of the reactor.

Valved line 68 is provided for recycling hydrogenous gases from stabilizer 32 back to furnace 12 in reactor 14. In some cases it will be desirable to recycle a substantial part of the gases directly without purification and to purify only a portion of the hydrogenous gases, the purified hydrogen being returned to reactor 14 as hereinabove described. The amount of hydrogen purification may thus be regulated so as to eliminate any desired amount of impurities and maintain the hydrogen concentration in reactor 14 at any desired level.

Besides its use in the conversion of naphthas with hydrogen, my process of purifying hydrogen may be employed in a variety of other operations such as in the hydrogenation of vegetable and animal oils, fish oils, etc., hydrogenation of polymers, heavy mineral oils, tar, coal, preparation of pure hydrogen for lighter-than-air aircraft, etc.

Although I have described my invention with respect to certain specific embodiments thereof, it is to be understood that these are by way of illustration rather than by way of limitation and that I do not mean to be restricted thereto but only to the scope of the appended claims.

I claim:

1. The process of purifying hydrogen contained in a hydrogenous gas mixture with hydrocarbon gases which comprises contacting said gas mixture in a hydrogenating stage with an aromatic hydrocarbon in the presence of a hydrogenating catalyst, thereby effecting hydrogenation of said aromatic hydrocarbons to hydro-aromatic hydrocarbons, separating said hydro-aromatic hydrocarbons from residual hydrocarbon gases, contacting said hydro-aromatic hydrocarbons with a dehydrogenating catalyst under dehydrogenating conditions of temperature and pressure whereby hydrogen is produced and aromatic hydrocarbons are regenerated, separating the hydrogen from said regenerated aromatic hydrocarbons and recycling said regenerated aromatic hydrocarbons back to said hydrogenating stage of the process.

2. The process of claim 1 wherein one of said catalysts comprises an oxide of a transition element selected from Groups II to VI of the Periodic System.

3. The process of claim 1 wherein the hydrogenating catalyst is comprised of an oxide of a VIth group metal supported on active alumina.

4. The process of reforming low octane number paraffinic naphthas which comprises vaporizing said naphthas and passing the heated vapors thereof into contact with a dehydrogenating catalyst at aromatizing conditions of temperature and pressure in the presence of nascent hydrogen resulting from the simultaneous dehydrogenation of an added hydro-aromatic hydrocarbon, thereby converting said hydro-aromatic hydrocarbon into an aromatic hydrocarbon, separating from reformed naphtha products said aromatic hydrocarbon and rehydrogenating it to a hydro-aromatic hydrocarbon by treatment with a hydrogen-containing hydrocarbon gas and recycling the regenerated hydro-aromatic hydrocarbon in the process.

5. The process of aromatizing low knock rating paraffinic naphtha which comprises vaporizing a stream of said naphtha and contacting it continuously with a dehydrogenating catalyst at a relatively low pressure and at aromatizing temperature, continuously adding a hydro-aromatic hydrocarbon to said naphtha in the presence of said catalyst, thereby sustaining the activity of said catalyst and dehydrogenating said added hydro-aromatic hydrocarbon to produce an aromatic hydrocarbon therefrom while simultaneously aromatizing paraffin hydrocarbons, separating an aromatic hydrocarbon fraction from the products, separating a hydrogen-containing hydrocarbon gas from said products, treating said aromatic hydrocarbon fraction with said gas at a relatively high pressure in the presence of hydrogenating catalysts, whereby hydrogen contained in said gas is combined with said aromatic hydrocarbon to regenerate hydro-aromatic hydrocarbon, recovering hydro-aromatic hydrocarbon thus produced from said gas and recycling said hydro-aromatic hydrocarbon to said relatively low pressure aromatizing step of the process.

6. The process of claim 5 wherein the pressure employed in said aromatizing step is between about 50 and about 450 pounds per square inch and the pressure employed in said aromatic hydrocarbon hydrogenation step is about 500 to 5000 pounds per square inch.

7. The process of claim 5 wherein the catalyst employed in both said aromatizing and said hydrogenation steps is comprised of an oxide of a metal of the VIth group of the periodic system.

8. The process of claim 5 wherein the catalyst employed in both said aromatizing and said hydrogenation steps is comprised of molybdenum oxide supported on active alumina.

9. The process of claim 5 wherein the catalyst employed in both said aromatizing and said hydrogenation steps is comprised of chromium oxide supported on active alumina.

10. In the process of aromatizing low knock rating paraffinic petroleum naphtha to produce high knock rating gasoline wherein a stream of naphtha vapors is contacted with a solid dehydrogenating catalyst at an aromatizing temperature with a net production of hydrogen, the improvement comprising separating from the products of said contacting operation a high knock rating gasoline fraction, a benzene fraction, and a hydrogen-containing hydrocarbon gas, recycling a portion of said gas to said contacting operation, converting said benzene fraction into hydrobenzene with the aid of a hydrogenating catalyst and another portion of said hydrogen-containing gas, separating said hydrobenzene from hydrocarbon gases and introducing said hydrobenzene into said naphtha contacting step first mentioned.

ROBERT F. MARSCHNER.

CERTIFICATE OF CORRECTION.

Patent No. 2,328,828. September 7, 1943.

ROBERT F. MARSCHNER.

It is hereby certified that error appears in the printed specification of the above numbered patent requiring correction as follows: Page 4, first column, lines 8 and 9, claim 5, for "hydrocarbons, separating" read --hydrocarbons in said naphtha, separating--; and that the said Letters Patent should be read with this correction therein that the same may conform to the record of the case in the Patent Office.

Signed and sealed this 16th day of November, A. D. 1943.

(Seal)

Henry Van Arsdale,
Acting Commissioner of Patents.